US011941107B1

(12) United States Patent
Wang et al.

(10) Patent No.: US 11,941,107 B1
(45) Date of Patent: *Mar. 26, 2024

(54) COMPUTER INTERFACES AND AUTHENTICATION PROTOCOLS FOR SECURELY LINKING AND TRANSFERRING CONTENT BETWEEN ONLINE ACCOUNTS

(71) Applicant: STARBUCKS CORPORATION, Seattle, WA (US)

(72) Inventors: Ita Eddie Wang, Seattle, WA (US); Christopher Estes, Seattle, WA (US); Ehudes Fernan Garcia Gil, Puyallup, WA (US); Krishna Sumanth Chagarlamudi, Seattle, WA (US); Hou Lam, Seattle, WA (US); Fernando Augusto Alvarez Medina, Winter Springs, FL (US); Clayton Timothy Brandt, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,609

(22) Filed: Sep. 15, 2023

Related U.S. Application Data

(63) Continuation of application No. 18/072,860, filed on Dec. 1, 2022, now Pat. No. 11,797,662.

(51) Int. Cl.
*G06F 21/45* (2013.01)
*G06Q 30/0226* (2023.01)
*H04W 12/084* (2021.01)

(52) U.S. Cl.
CPC ......... *G06F 21/45* (2013.01); *G06Q 30/0227* (2013.01); *H04W 12/084* (2021.01)

(58) Field of Classification Search
None
See application file for complete search history.

(56) References Cited

U.S. PATENT DOCUMENTS

2009/0299846 A1  12/2009  Brueggemann et al.
2011/0004753 A1   1/2011  Gomi et al.
(Continued)

OTHER PUBLICATIONS

PCT/US2023/037082, "International Search Report and Written Opinion", dated Feb. 2, 2024, 12 pages.

*Primary Examiner* — Nelson S. Giddins
(74) *Attorney, Agent, or Firm* — Kilpatrick Townsend & Stockton LLP

(57) ABSTRACT

Some examples described herein relate to computer interfaces and authentication protocols for securely linking and transferring content between online accounts. In one example, a system can provide a graphical user interface (GUI) with multiple interactive interface pages, through which a user can selectively transfer content from a first online account to a second online account. For example, the user can select to transfer points from the first online account to the second online account. The system can then transfer of the selected content from the first online account to the second online account. To perform this transfer, the system can employ multiple layers of authentication and other security mechanisms. For example, the system can employ two or more layers of authentication and a unique external identifier to perform the transfer. Following the transfer, the GUI can be updated to reflect the results of the transfer.

20 Claims, 10 Drawing Sheets

(56) References Cited

U.S. PATENT DOCUMENTS

| | | |
|---|---|---|
| 2021/0150560 A1 | 5/2021 | Gupta et al. |
| 2021/0279764 A1* | 9/2021 | Key .................... G06Q 30/0226 |
| 2023/0126143 A1* | 4/2023 | Rankin .............. G06Q 30/0226 |
| | | 705/14.33 |
| 2023/0273989 A1* | 8/2023 | Bordow .................. G06F 21/45 |
| | | 726/6 |

\* cited by examiner

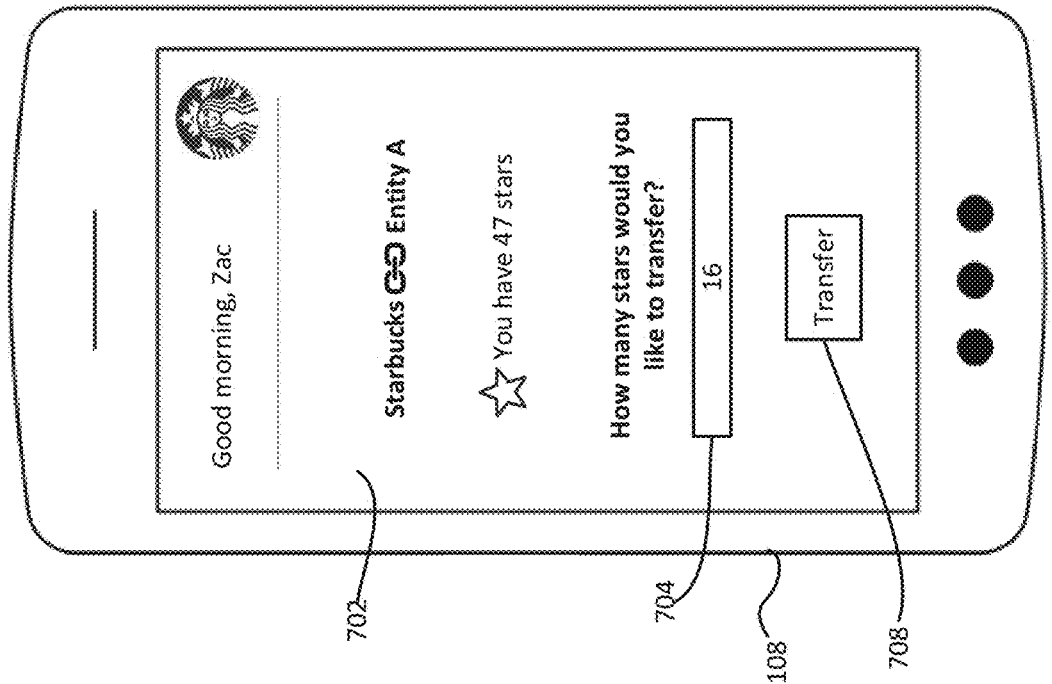

US 11,941,107 B1

COMPUTER INTERFACES AND AUTHENTICATION PROTOCOLS FOR SECURELY LINKING AND TRANSFERRING CONTENT BETWEEN ONLINE ACCOUNTS

REFERENCE TO RELATED APPLICATIONS

This application is a continuation of co-pending U.S. patent application Ser. No. 18/072,860, filed Dec. 1, 2022, titled "Computer Interfaces and Authentication Protocols for Securely Linking and Transferring Content Between Online Accounts," the entirety of which is hereby incorporated by reference herein.

TECHNICAL FIELD

The present disclosure relates generally to computer security and content transfer. More specifically, but not by way of limitation, this disclosure relates to computer interfaces and authentication protocols for securely linking and transferring content between online accounts.

BACKGROUND

A user may have multiple online accounts with multiple different entities, such as different companies. The user may perform various operations using the online accounts. For example, the user may use a first online account to play a video game hosted on a server by a first entity. The user may also use their second online account to interact with a graphical user interface of a website. Each entity may generate data associated with the operations performed by the user. For example, the first entity may generate gameplay data associated with the user playing the video game. The second entity may generate interaction data associated with the user interacting with the graphical user interface of the website. Because these accounts are hosted by different entities, the accounts are typically isolated from one another and their associated content is not generally transferrable between the online accounts (e.g., for security purposes).

SUMMARY

One example of the present disclosure can include a system comprising one or more processors and one or more memories. The one or more memories can include instructions that are executable by the one or more processors to perform operations. The operations can include providing a graphical user interface (GUI) through which a user can transfer a selected amount of points from a first online account to a second online account, wherein the first online account is hosted on a first computer system of a first entity and the second online account is hosted on a second computer system of a second entity that is different from the first entity. The first online account can be allocated a first point total according to a first point system, and the second online account can be allocated a second point total according to a second point system that is different from the first point system. The operations can include detecting a user interaction with the GUI for transferring the selected amount of points from the first online account to the second online account. The operations can include, in response to detecting the user interaction, initiating a transfer of the selected amount of points from the first online account to the second online account. The first computer system can be configured to execute the transfer by: removing the selected amount of points from the first point total to create a first updated point total; converting the selected amount of points to an adjusted point value based on the second point system; and transmitting a data communication indicating the adjusted point value to the second computer system. The second computer system can be configured to receive the data communication and add the adjusted point value to the second point total to create a second updated point total for the second online account. The operations can include updating the GUI to indicate the first updated point total or the second updated point total.

Another example of the present disclosure can include a non-transitory computer-readable medium comprising program code that is executable by one or more processors for causing the one or more processors to perform operations. The operations can include providing a graphical user interface (GUI) through which a user can transfer a selected amount of points from a first online account to a second online account, wherein the first online account is hosted on a first computer system of a first entity and the second online account is hosted on a second computer system of a second entity that is different from the first entity. The first online account can be allocated a first point total according to a first point system, and the second online account can be allocated a second point total according to a second point system that is different from the first point system. The operations can include detecting a user interaction with the GUI for transferring the selected amount of points from the first online account to the second online account. The operations can include, in response to detecting the user interaction, initiating a transfer of the selected amount of points from the first online account to the second online account. The first computer system can be configured to execute the transfer by: removing the selected amount of points from the first point total to create a first updated point total; converting the selected amount of points to an adjusted point value based on the second point system; and transmitting a data communication indicating the adjusted point value to the second computer system. The second computer system can be configured to receive the data communication and add the adjusted point value to the second point total to create a second updated point total for the second online account. The operations can include updating the GUI to indicate the first updated point total or the second updated point total.

Still another example of the present disclosure can include a method. The method can include providing a graphical user interface (GUI) through which a user can transfer a selected amount of points from a first online account to a second online account, wherein the first online account is hosted on a first computer system of a first entity and the second online account is hosted on a second computer system of a second entity that is different from the first entity. The first online account can be allocated a first point total according to a first point system, and the second online account can be allocated a second point total according to a second point system that is different from the first point system. The method can include detecting a user interaction with the GUI for transferring the selected amount of points from the first online account to the second online account. The method can include, in response to detecting the user interaction, initiating a transfer of the selected amount of points from the first online account to the second online account. The first computer system can be configured to execute the transfer by: removing the selected amount of points from the first point total to create a first updated point total; converting the selected amount of points to an adjusted point value based on the second point system; and transmitting a data communication indicating the adjusted point value to the second computer system. The second computer system can be configured to receive the data communication and add the adjusted point value to the second point total to create a second updated point total for the second online account. The method can include updating the GUI to indicate the first updated point total or the second updated point total. Some or all of the method can be implemented by one or more processors.

BRIEF DESCRIPTION OF THE DRAWINGS

FIG. 6 shows an example of a GUI page for selecting to transfer points between online accounts according to some aspects of the present disclosure.

FIG. 7 shows an example of a GUI page for selecting how many points to transfer according to some aspects of the present disclosure.

DETAILED DESCRIPTION

Figure 1:
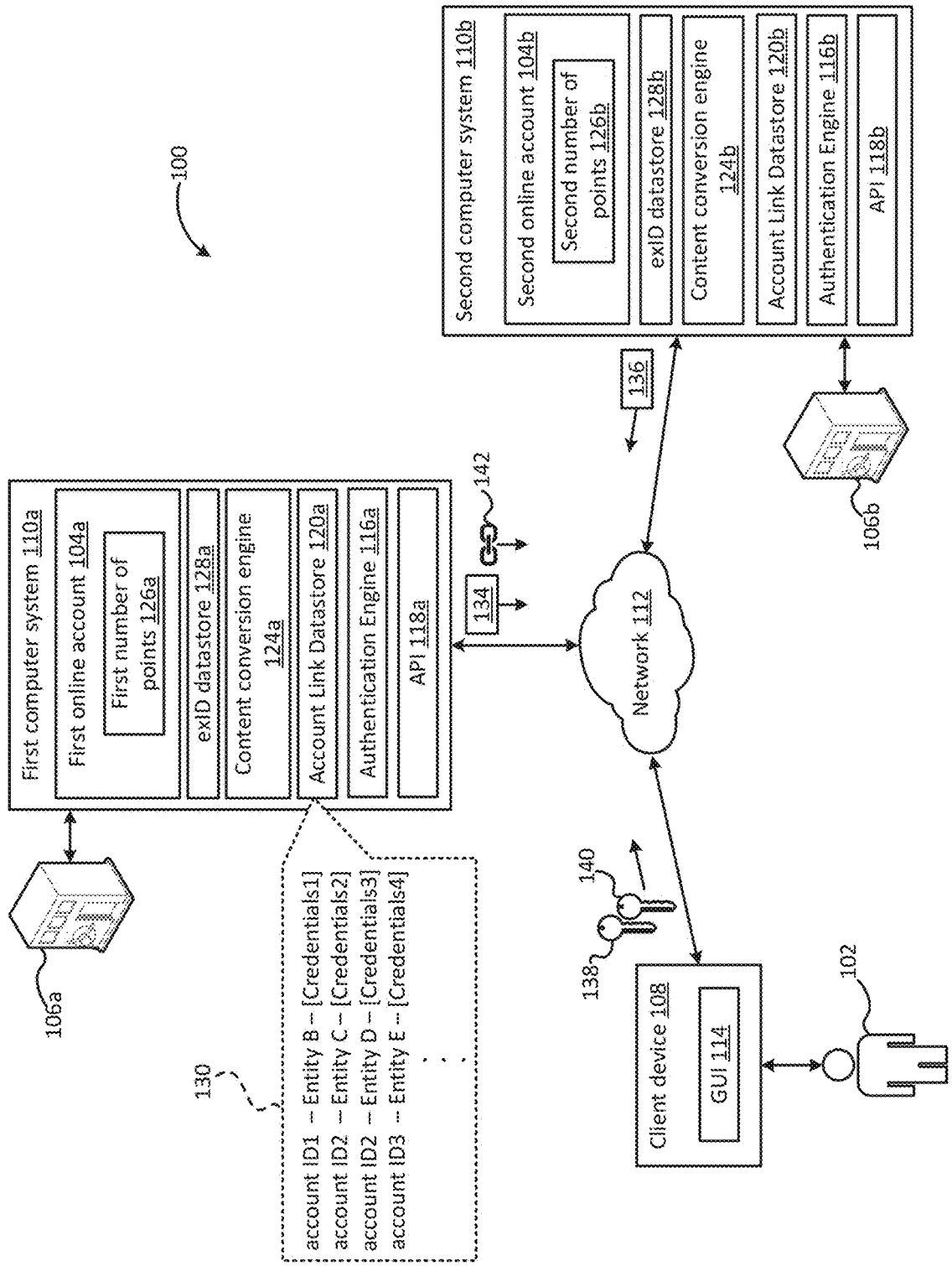
FIG. 1 shows a block diagram of an example of a system for providing computer interfaces and authentication protocols for securely linking and transferring content between online accounts according to some aspects of the present disclosure.

Certain aspects and features of the present disclosure involve computer interfaces and authentication protocols for securely linking and transferring content between online accounts. For example, a system can provide a graphical user interface (GUI) with multiple interactive interface pages, through which a user can selectively transfer content from a first online account to a second online account. For example, the user can select to transfer points from their first online account to their second online account. The system can then transfer of the selected content from the first online account to the second online account. To perform this transfer, the system can employ multiple layers of authentication and other security mechanisms. For example, the system can employ two or more layers of authentication and a unique external identifier to effectuate the transfer. Following the transfer, the GUI can be updated to reflect the results of the transfer.

Users may want to link their online accounts for a variety of reasons. For example, a user may want to link their online accounts to selectively transfer content between the online accounts. But it has traditionally been challenging to link online accounts together, because the online accounts are normally hosted on different computer systems by different entities. This can raise security challenges and other technical problems, for instance if the computer systems use different content formats. For example, a first computer system may allocate points using a first point system and a second computer system may allocate points using a second point system, requiring a translation between the two point systems for successful integration of the online accounts. Because of these challenges, entities do not commonly provide the capability to link online accounts and perform this type of content transfer.

Some examples of the present disclosure can overcome one or more of the abovementioned problems by providing a combination of graphical user interfaces and authentication mechanisms designed to simplify and secure the process of linking two or more online accounts and transferring content between the online accounts. For example, a system described herein can include a mobile application or website that provides a series of graphical user interface (GUI) pages that allow a user to selectively link a first online account to a second online account, where the first online account is hosted by a first computer system and the second online account is hosted by a second computer system. To effectuate this link, the system can first require the user to login to the first online account using a first set of login credentials. After logging in, the system can require the user to supply a second set of login credentials for the second online account. The first computer system can then execute a multi-layer authentication process with the second computer system. If the multi-layer authentication process succeeds, the first computer system and the second computer system can establish a link between the first online account and the second online account. Once the link has been establish, the user may be allowed to transfer content between the two online accounts. By using multiple layers of authentication, the linking process can be more fully secured.

After linking two online accounts together, the GUI may provide the capability to transfer content between the online accounts. In some cases, transferring content from a first online account to a second online account may not be straightforward, because there may need to be content translation (e.g., a conversion) to resolve differences between the online accounts. For example, the first online account may be assigned a first number of points according to a first point system, and the second online account may be assigned a second number of points according to a second point system. A point system can be a method for assigning points. If the first point system is different than the second point system, there may need to be a conversion between the point systems, so that the points are accurately transferred from the first online account to the second online account. Some examples of the present disclosure can include a content conversion engine to help perform such a conversion. The content conversion engine can take into account various factors when converting content between formats (e.g., point systems) associated with the online accounts. Since some of the factors may change over time, the conversion process can be dynamic rather than fixed. For instance, the conversion process may depend on the day of the week, one or more attributes of the user, one or more attributes of the first online account, one or more attributes of the second online account, one or more events, or any combination of these. Using the content conversion engine, the content can be accurately translated between formats for transfer between the online accounts.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for providing computer interfaces and authentication protocols for securely linking and transferring content between online accounts according to some aspects of the present disclosure. In this example, the system 100 can include a user 102 that has a first online account 104a with a first entity 106a and a second online account 104b with a second entity 106b, where the first entity 106a is different than the second entity 106b. In some examples, the first entity 106a may provide different types of products and services than the second entity 106b. For example, the first entity 106a may be a coffee manufacturer and the second entity 106b may be an air carrier or retailer.

The first online account 104a can be hosted by a first computer system 110a and the second online account 104b can be hosted by a second computer system 110b. The first computer system 110a can include any number and combination of networked computing devices, such as physical servers or virtual servers. The second computer system 110b can also include any number and combination of networked computing devices. As shown in FIG. 1, the second computer system 110 is separate from the first computer system 110a and capable of communicating with the first computer system 110a via one or more networks 112, such as the Internet.

The first online account 104a may be assigned a first number of points 126a and the second online account 104b may be assigned a second number of points 126b. The points may be non-monetary rewards issued by the first entity 106a and the second entity 106b based on various factors, such as one or more attributes of the user 102, one or more attributes of the first online account 104a, one or more attributes of the second online account 104b, one or more events, or any combination of these. Examples of attributes of the user 102 can include the user's age, location, or interests. Examples of attributes of an online account can include an account type, an account status or level, an account history, or a digital asset (e.g., a non-fungible token) linked to the online account. Examples of the events can include holidays and product launches.

As one particular example, the user 102 may acquire a non-fungible token (NFT) from an entity, such as the first entity 106a or the second entity 106b. The user 102 can then link the NFT to their first online account 104a, for example by transferring the NFT to a digital wallet (e.g., a blockchain address) associated with the first online account 104a. The digital wallet can be assigned to the first online account 104a by the first computer system 110a, which may generate and maintain the digital wallet on behalf of the user 102. Transferring the NFT to the digital wallet may trigger a change to the first number of points 126a associated with the first online account 104a. For example, the first computer system 110a may award the user 102 additional points based on the linked NFT. In some examples, the first computer system 110a may adjust future point-awards by a multiplication factor based on the linked NFT, so that the NFT acts as a multiplier for the point awards.

It will be appreciated that an NFT is a unique object, such as a cryptographic token, which is recorded on a blockchain to represent a unique physical or digital asset. NFTs each have their own unique information and attributes, so they are not mutually interchangeable with other NFTs. This makes NFTs different from fungible assets like cryptocurrencies. While a digital asset, such as an image represented by an NFT on the blockchain, may be relatively easily copied among computers with or without permission from the true owner, the NFT itself can only be transferred among owners through blockchain transactions that are validated by the blockchain network and recorded on the blockchain. In many cases, NFTs are minted via "smart contracts," which are self-executing contracts or self-enforcing agreements in the form of executable program code, which can be stored on the blockchain and executed by one more connected devices (e.g., nodes).

Continuing with FIG. 1, the user 102 can operate a client device 108 to access the first online account 104a and the second online account 104b. For example, the user 102 can operate the client device 108 to connect to the first computer system 110a via the network 112, to thereby access the first online account 104a. The user 102 may also operate the client device 108 to connect to the second computer system 110b via the network 112, to thereby access the second online account 104b. Examples of the client device 108 can include a laptop computer, desktop computer, mobile phone, tablet, e-reader, or wearable device such as a smart watch.

In some examples, the user 102 may want to link the first online account 104a to the second online account 104b. Linking the online accounts 104a-b may allow for content (e.g., points or information) to be transferred between the online accounts 104a-b. To link the two online accounts 104a-b, the user 102 may begin by logging into the first online account 104a. This may involve the user 102 providing a first set of login credentials 140 to the first computer system 110a to authenticate with the first computer system 110a. The first set of login credentials 140 can include one or more login credentials. Examples of such login credentials can include a username, a password, a biometric marker, a pin code, or any combination of these. The first set of login credentials 140 may have previously been selected by the user 102, for example when signing up for the first online account 104a.

After logging into the first online account 104, the user 102 may be presented with a graphical user interface (GUI) 114. For example, the GUI 114 can be output on a display of the client device 108. The GUI 114 may be generated at least in part by a software program running on the client device 108. For example, the software program can be a native application, and the GUI 114 can be built into the native application. As another example, the software program can be a website browser, and the GUI 114 can be part of a website rendered in the website browser. In some examples, the GUI 114 may be generated at least in part by the first computer system 110a. For example, the first computer system 110a may generate and transmit webpage code (e.g., HTML, CSS, or JavaScript) to the client device

108, where the webpage code defines some or all of the GUI 114. The client device 108 can receive the webpage code and render it using a website browser, thereby producing some or all of the GUI 114.

The GUI 114 can allow the user 102 to selectively link the second online account 104b to the first online account 104a. For example, the GUI 114 may include a list of entities that provide online accounts capable of being linked to the first online account 104a. The user 102 may select one of the entities on the list which, in this example, may be the second entity 106b with whom the user 102 has the second online account 104b. The GUI 114 may then request that the user 102 supply a second set of login credentials 138 for authenticating with the second computer system 110b. The second set of login credentials 138 can include one or more login credentials, such as a username, a password, a biometric marker, a pin code, or any combination of these. The second set of login credentials 138 may have previously been selected by the user 102, for example when signing up for the second online account 104b.

After inputting the second set of login credentials, the user 102 can press a button in the GUI 114 to initiate a process for linking the second online account 104b to the first online account 104a. The process may begin with the client device 108 transmitting the second set of login credentials 138 to the second computer system 110b. The client device 108 may transmit the second set of login credentials 138 to an API 118b of the second computer system 110b. The second computer system 110b can receive the second set of login credentials 138 and validate them. If they are invalid, the second computer system 110b can reject the request. If the second set of login credentials 138 are valid, the second computer system 110b can generate an authentication code 144 and provide it to the client device 108. The authentication code may be a numerical code, an alphanumerical code, or another type of code generated using a code generator. The authentication code may be specific to a session between the client device 108 and the second computer system 110b. The second computer system 110b may also provide an authentication approval, such as authentication approval 136, to the client device 108.

The client device 108 can receive the authentication code 144 and transmit it to the first computer system 110a via the network 112. The first computer system 110a (e.g., first authentication engine 116a) can receive the authentication code 144. The first computer system 110a can then transmit an authentication communication 134 to the second computer system 110b. In some examples, the first authentication engine 116a can transmit the authentication communication 134 to an application programming interface (API) 118b of the second computer system 110b. The authentication communication 134 can include authentication code 144 and primary authentication credentials. The primary authentication credentials can include one or more login credentials of the first computer system 110a for use in authenticating with the second computer system 110b. The primary authentication credentials are different from the first set of login credentials and the second set of login credentials, at least because the primary authentication credentials are not associated with the user 102. Rather, the primary authentication credentials are specific to the first computer system 110a for authenticating with the second computer system 110b. The primary authentication credentials may have been previously set by the first computer system 110a or the second computer system 110b. The first set of login credentials 140 and second set of login credentials 138 can be considered secondary authentication credentials as compared to the primary authentication credentials of the first computer system 110a.

The second computer system 110b can receive the primary authentication credentials and the authentication code 144 via the API 118b. The second computer system 110b can then validate the primary authentication credentials and the authentication code 144, for example by using a second authentication engine 116b. If they are valid, the second authentication engine 116b can generate an access token 146. For example, the second authentication engine 116b can mint an access token 146 using a token generator. The access token 146 can be different from the authentication code 144, the first set of login credentials 140, the second set of login credentials 138, and the primary authentication credentials. The second computer system 110 can then transmit an authentication approval, such as authentication approval 136, to the first computer system 110a to indicate that the authentication was successful. The authentication approval may include the access token 146. The second authentication engine 116b may transmit the authentication approval to an API 118a of the first computer system 110a. The first authentication engine 116a can receive the authentication approval via the API 118a. A communication session may then be established between the two computer systems 110a-b. The communication session can allow the computer systems 110a-b to engage in communications for a period of time without reauthenticating with one another. By using the authentication code 144 and access token 146, the second set of login credentials 138 may be hidden from first computer system 110a, which may improve security.

After receiving the access token 146, the first computer system can initiate a link between the first online account 104a and the second online account 104b. For example, the first authentication engine 116a can transmit the access token 146, and a request to link the first online account 104a and the second online account 104b, to the second computer system 110b. The second computer system 110b can receive the access token 146 and the request, validate the access token 146, and if the access token 146 is valid, link the first online account 104a and the second online account 104b. This may involve the second computer system 110b generating a link between the first online account 104a and the second online account 104b in its account link datastore 120b. The account link datastore 120b may include any number and combination of datastores (e.g., databases). The link can correlate a first unique identifier of the first online account 104a to a second unique identifier of the second online account 104b. In some examples, the first unique identifier may be generated by the first computer system 110a and the second unique identifier may be generated by the second computer system 110b. Alternatively, the first and second unique identifiers may both be generated by the first computer system 110a or the second computer system 110b.

In some examples, the second computer system 110b can also generate an external account identifier (exID) after validating the access token 146 and provide it to the first computer system 110a (e.g., via the APIs 118a-b). The external account identifier can be a unique identifier of the second online account 104b that is generated by the second computer system 110b, and that is different from an internal account identifier used by the second computer system 110b to identify the second online account 104b. The second computer system 110b can use the exID to refer to the second online account 104b when communicating with external computing systems, such as the first computing system 110a. This can prevent the second computer system 110*b* from exposing sensitive information, like the internal account identifier, to other entities.

In some examples, the second computer system 110*b* can generate a unique exID for each {online account, external entity} pair, so that no two external entities use the same exID to reference the same online account. For example, the second online account 104*b* may be assigned exID #12345 for use with Entity A. And, the second online account 104*b* may be assigned exID #67890 for use with Entity B. The second computer system 110*b* may only use exID #12345 when communicating with Entity A about the second online account 104*b*, and may only use exID #67890 when communicating with Entity B about the second online account 104*b*. This may avoid exposing each entity's exID to other entities, thereby improving the security of the system.

The second computer system 110*b* can include an exID datastore 128*b* to maintain the exID mappings. Although the exID datastore 128*b* is shown separately from the account link datastore 120*b* in FIG. 1, in other examples the exID mappings may part of the account link datastore 120*b*. The exID mappings can indicate which exID is assigned to each {online account, external entity} pair. For example, each entry in the exID mappings can correlate an exID to an internal account identifier and an entity identifier. This can allow the second computer system 110*b* to know which exID to use when communicating with a given entity about a given online account.

As noted above, the second computer system 110*b* can generate an exID for the second online account 104*b*. After generating the exID for the second online account 104*b*, the second computer system 110*b* can provide the exID to the first computer system 110*a* for use in referencing the second online account 104*b*. This can help ensure that both computer systems 110*a-b* are using the same exID to refer to the same online account. The first computer system 110*a* can receive the exID for the second online account 104*b* and save it in its own exID datastore 128*a*. If the computer systems 110*a-b* subsequently transmit communications (e.g., commands) relating to the second online account 104*b*, they can include the exID for the second online account 104*b* in the communications. If an invalid exID is provided in a communication, the communication can be rejected as unauthorized. An exID may be invalid if it is unknown or incorrect. Validating the exID may provide yet another authentication mechanism that improves the security of the system, because malicious actors may not know the correct exID to include in malicious communications.

While the above example involved the second computer system 110*b* assigning an exID to the second online account 104*b*, the first computer system 110*a* may additionally or alternatively assign an exID to the first online account 104*a*. The first computer system 110*a* can use the exID to refer to the first online account 104 when communicating with other computer systems, such as the second computer system 110*b*. This can prevent the first computer system 110*a* from exposing sensitive information, like its internal account identifier for the first online account 104*a*. After generating an exID for the first online account 104*a*, the first computer system 110*a* can save the exID mapping in its exID datastore 128*a*. The first computer system 110*a* can also provide the exID to the second computer system 110*b* for use in referencing the first online account 104*a*. The second computer system 110*b* can receive the exID for the first online account 104*a* and save it in the exID datastore 128*b*. The computer systems 110*a-b* may then include the exID in their communications for validation purposes.

In some examples, the first computer system 110*a* may additionally or alternatively generate a link between the first online account 104*a* and the second online account 104*b* in its account link datastore 120*a*. The account link datastore 120*a* may include any number and combination of datastores (e.g., databases). The link can correlate a first unique identifier of the first online account 104*a* to a second unique identifier of the second online account 104*b*. In some examples, the first unique identifier may be generated by the first computer system 110*a* and the second unique identifier may be generated by the second computer system 110*b*. For example, the second unique identifier may be an exID generated by the second computer system 110*b*. Alternatively, the first and second unique identifiers may both be generated by the first computer system 110*a* or the second computer system 110*b* (and transmitted to the other computer system).

One example of the contents of the account link datastore 120*a* is showed in dashed box 130. As shown, the account link datastore 120*a* includes multiple entries (e.g., links), where each entry correlates an account identifier to an entity identifier and a corresponding exID. In this example, account ID1 can correspond to the first unique identifier described above, for example to uniquely identify the first online account 104*a*. Entity B can correspond to the second unique identifier described above, for example to uniquely identify the second entity 106*b*. Alternatively, ExID1 can correspond to the second unique identifier described above, for example to uniquely identify the second online account 104*b* hosted by the second entity 106*b*. ExID can be an external identifier provided by the corresponding entity. For example, ExID1 may correspond to an external identifier for the second online account 104*b*, where the external identifier was provided to the first computer system 110*a* by the second computer system 110*b*. As shown, it is also possible for a single account to be linked to multiple other accounts. For example, account ID2 is simultaneously linked to two different entities (Entity C and Entity D) in the account link datastore 120*a*.

If the first computer system 110*a* successfully links the first online account to the second online account, the first computer system 110*a* may transmit a link notification 142 to the second computer system 110*b*. For example, the first authentication engine 116*a* can transmit the link notification 142 to the API 118*b* of the second computer system 110*b*. The link notification 142 may indicate that the first online account of the user 102 was linked to the second entity 106*b* (e.g., the second online account 104*b* hosted by the second entity 106*b*).

The above process employs multiple layers of authentication to improve security—a first layer in which the user 102 authenticates with the first computer system 110*a* using the first set of login credentials 140, a second layer in which the user 102 authenticates with the second computer system 110*b* using the second set of login credentials 138, and a third layer in which the first computer system 110*a* authenticates with the second computer system 110*b* using the authentication code 144 and primary authentication credentials. The computer systems 110*a-b* may also employ other security mechanisms, such as a list of authorized internet protocol (IP) addresses that are allowed to submit commands to the APIs 118*a-b*. This multifaceted security architecture can prevent malicious actors from abusing the system 100, for example by requiring that all commands originate from an authorized IP address that has been authenticated using the primary authentication credentials.

After establishing the link between the online accounts 104*a-b*, the user 102 may then be able to transfer content (e.g., points or data) between the online accounts 104*a-b*. For example, the user 102 may want to transfer points from the first online account 104*a* to the second online account 104*b*. So, the user 102 can interact with the GUI 114 to transfer a selected amount of points from the first online account 104*a* to the second online account 104*b*. This may involve reducing the first number of points 126*a* by the selected amount and increasing the second number of points 126*b* by the selected amount.

To effectuate the transfer, the first computer system 110*a* may transmit a command to the API 118*b* indicating the primary authentication credentials, the exID associated with the second online account 104*b*, and the selected amount of points to transfer. The second computer system 110*b* can receive the command and responsively update the second number of points 126*b* accordingly, for example by increasing them by the selected amount. The second computer system 110*b* may then transmit a success notification back to the first computer system 110*a* (e.g., via the API 118*a*) indicating that the transfer was successful. Based on receiving the success notification, the first computing system 110*a* can update the first number of points 126*a* accordingly, for example by decreasing them by the selected amount.

Transfers can also take place in the opposite direction. For example, the user 102 may want to transfer points from the second online account 104*b* to the first online account 104*a*. To do so, the user 102 can interact with the GUI 114 to transfer a selected amount of points from the second online account 104*b* to the first online account 104*a*. This may involve reducing the second number of points 126*b* by the selected amount and increasing the first number of points 126*a* by the selected amount. For example, the first computer system 110*a* may transmit a command to the API 118*b* indicating the primary authentication credentials, the exID associated with the second online account 104*b*, and the selected amount of points to transfer. The second computer system 110*b* can receive the command and responsively update the second number of points 126*b* accordingly, for example by decreasing them by the selected amount. The second computer system 110*b* may then transmit a success notification back to the first computer system 110*a* (e.g., via the API 118*a*) indicating that the transfer was successful. Based on receiving the success notification, the first computing system 110*a* can update the first number of points 126*a* accordingly, for example by increasing them by the selected amount.

In some examples, the first online account 104*a* may allocate or save content in a first way and the second online account 104*b* may allocate or save content in a second way that is different from the first way. For example, the first computer system 110*a* can allocate a first type of points to the first online account 104*a* using a first point system. And, the second computer system 110*b* can allocate a second type of points to the second online account 104*b* using a second point system, where the second point system is different from the first point system. So, to transfer points from one online account to the other online account, the system 100 can perform a translation to between the two types of points. For example, the user 102 may want to transfer a selected amount of points from the first online account 104*a* to the second online account 104*b*. To effectuate the transfer, the first computer system 110*a* can remove the selected amount of points from the first number of points 126*a* to create a first updated point total, convert the selected amount of points to an adjusted point value based on the second point system, and transmit a data communication indicating the adjusted point value to the second computer system 110*b*. The second computer system 110*b* can receive the data communication and add the adjusted point value to the second number of points 126*b*, to thereby create a second updated point total for the second online account 104*b*. The system 100 may then update the GUI 114 to indicate the first updated point total, the second updated point total, or both of these.

To perform the conversion process, the first computer system 110*a* can include a first content conversion engine 124*a*. The content conversion engine 124*a* can determine how to convert the content and then actually perform the conversion. When performing the conversion, the content conversion engine 124*a* can take into account various factors. Some of the factors may be dynamic in that they change over time. As a result, the conversion process can be dynamic rather than fixed. For example, the conversion process may depend on the date or time, one or more attributes of the user 102, one or more attributes of the first online account 104*a*, one or more attributes of the second online account 104*b*, one or more events, or any combination of these. Using the content conversion engine 124*a*, the content can be accurately translated for transfer between the online accounts. While these features are described with respect to the content conversion engine 124*a* of the first computer system 110*a*, in some examples the second computer system 110*b* may additionally or alternatively include content conversion engine 124*b*. This content conversion engine 124*b* can be configured to perform the content conversion described above, either alone or in cooperation with the content conversion engine 124*a* of the first computer system 110*a*.

In some examples, content other than points may also be transferred between the online accounts 104*a-b* using similar techniques as those described above. For example, other types of content such as transaction data or files may be transferred between the online accounts 104*a-b* using the techniques described herein. The examples described herein with reference to points are intended to be illustrative and non-limiting.

As mentioned above, the system 100 can generate a GUI 114 to help facilitate the process of linking and transferring content between online accounts. Some examples of various pages of the GUI 114 are shown in FIGS. 2-9, which will be described in turn below. But, it should be appreciated that these examples are intended to be illustrative and non-limiting. In other examples, the GUI 114 may have more pages, fewer pages, different pages, or a different order of pages than is shown. And, each GUI page may have different graphical elements than is shown.

Figure 2:
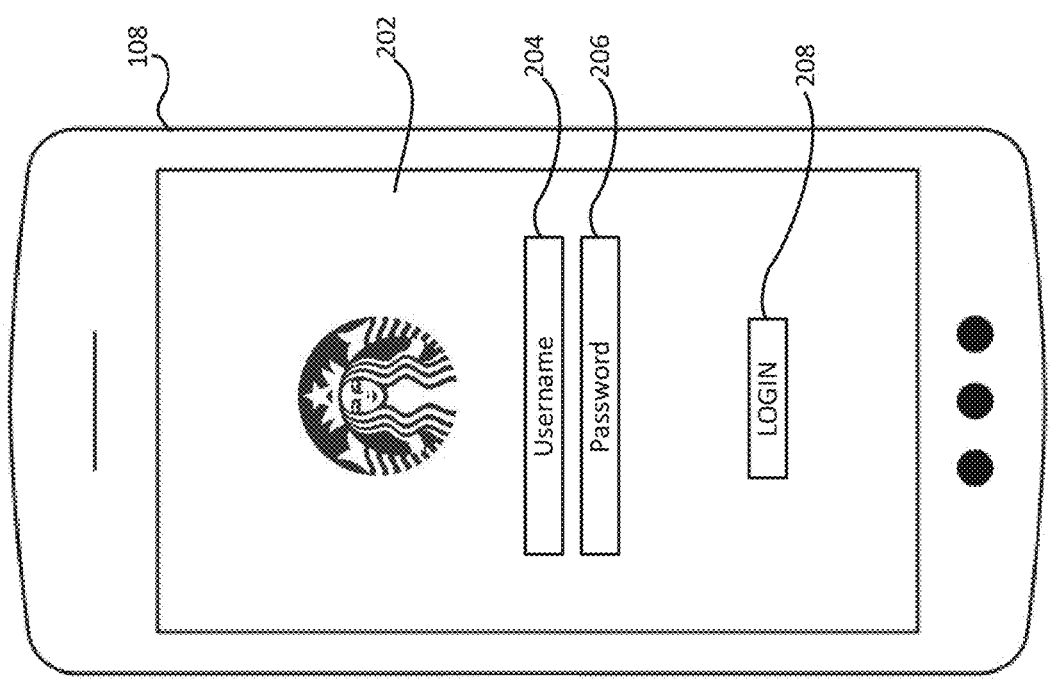
FIG. 2 shows an example of a graphical user interface (GUI) page for inputting a first set of login credentials for a first online account according to some aspects of the present disclosure.

Referring now to FIG. 2, shown is an example of a first GUI page 202 displayed on a client device 108 according to some aspects of the present disclosure. The first GUI page 202 can be a login page through which a user can login to their first online account. The user can input their first set of login credentials to the input boxes 204, 206. In this example, the first set of login credentials include a username and password. After entering the first set of login credentials, the user can press a login button 208 access the first online account.

Figure 3:
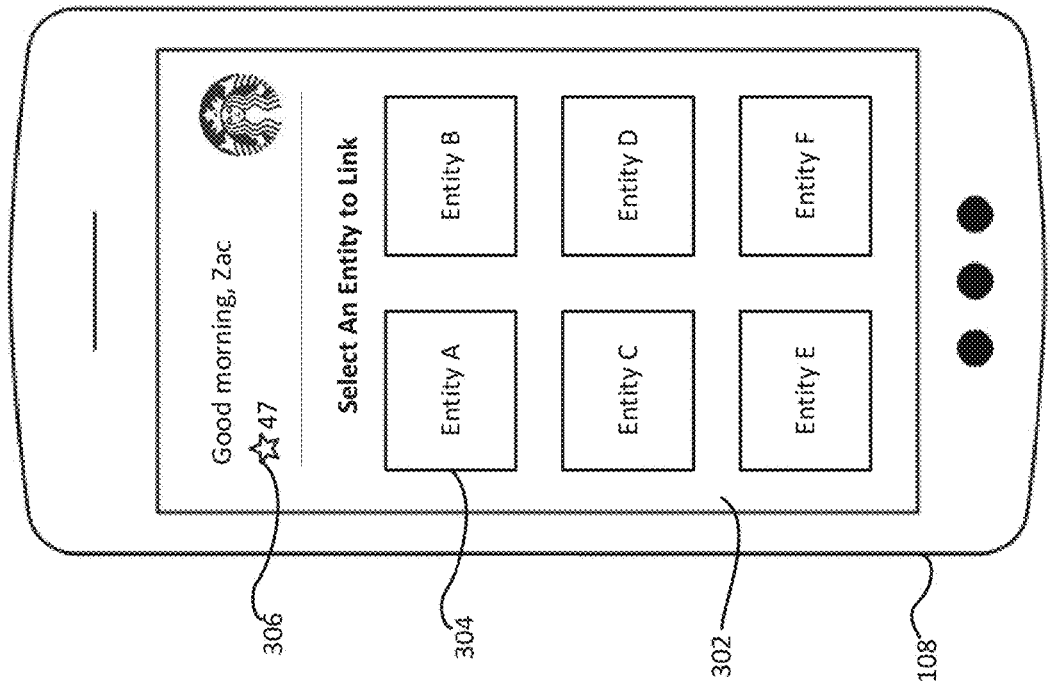
FIG. 3 shows an example of a GUI page for selecting a second online account to be linked to the first online account according to some aspects of the present disclosure.

Once logged in, the user can choose to link the first online account to a second online account. The user may be able to select the second online account via a second GUI page. One example of the second GUI page 302 is shown in FIG. 3. As shown, the second GUI page 302 can include graphical objects representing various entities. Examples of the graphical objects can include icons, logos, or textual content representing the various entities. Each entity may provide an online account that is capable of being linked to the first online account. The second GUI page 302 can also indicate a total number of points 306 assigned to the first online account. Points may be added or subtracted from the point total 306 based on various events, such as certain types of interactions. The user can select a graphical object 304 corresponding to a target entity, at which point the GUI can transition to a third GUI page.

Figure 5:
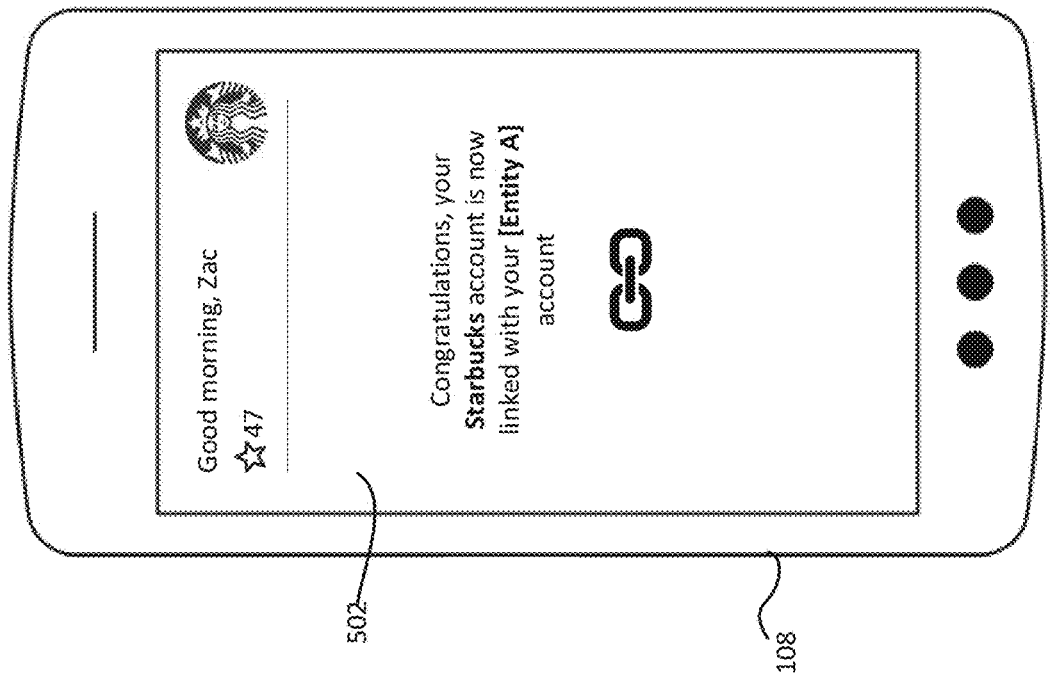
FIG. 5 shows an example of a GUI page for providing confirmation of an successful account link according to some aspects of the present disclosure.
Figure 4:
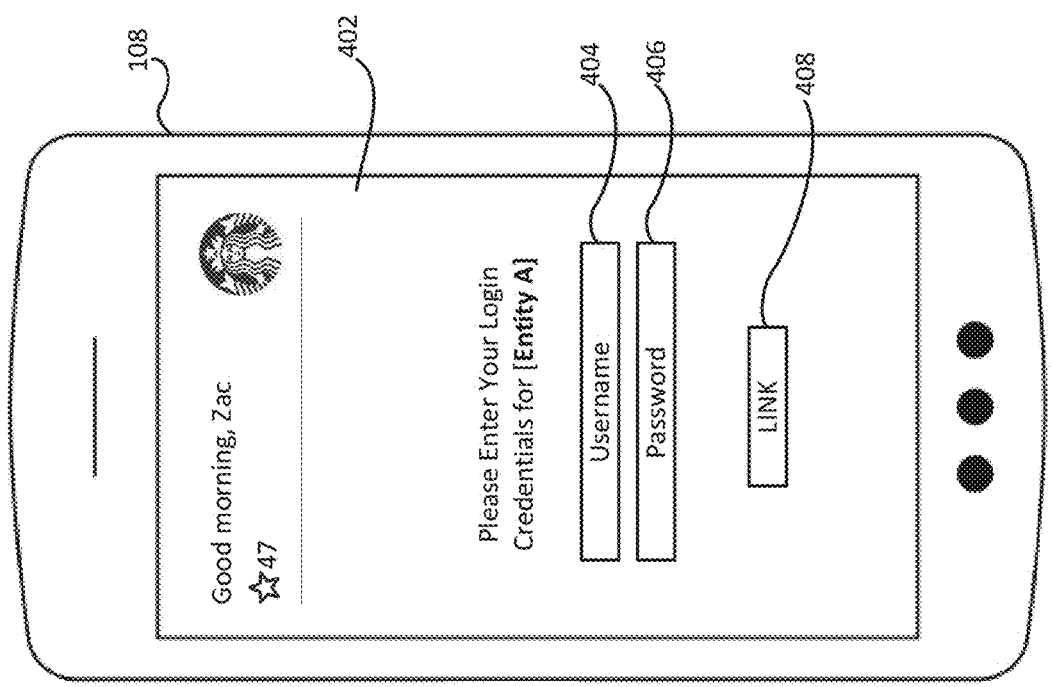
FIG. 4 shows an example of a GUI page for inputting a second set of login credentials for a second online account according to some aspects of the present disclosure.

One example of the third GUI page 402 is shown in FIG. 4. As shown, the third GUI page 402 can be another login page through which a user can input a second set of login credentials for a second online account with the selected entity. The user can input the second set of login credentials to the input boxes 404, 406. In this example, the second set of login credentials include a username and password. The second set of login credentials can be different from the first set of login credentials. After entering the second set of login credentials, the user can press a link button 408 to initiate the account-linking process described herein. Once the account-linking process is complete, the GUI may transition to a fourth GUI page 502 indicating that the account-linking process was successful. An example of the fourth GUI page 502 is shown in FIG. 5.

At a later point in time, the user may choose to access a fifth GUI page for transferring points (or other content) between the first online account and the second online account. One example of the fifth GUI page 602 is shown in FIG. 6. The fifth GUI page 602 can include options 604*a-b* for transferring points between the first online account and the second online account. Option 604*a* can be selectable for transferring points from the first online account to the second online account, and option 604*b* can be selectable for transferring points from the second online account to the first online account.

In this example, the first online account has a different point system than the second online account. In particular, the first online account uses a star system and the second online account uses a mile system. The points may be awards that differ from money. For example, stars and miles may be awarded by the first entity and the second entity, respectively, based on the occurrence of certain events (e.g., the user performing certain activities). The user can select the option 604*a* to convert stars in the first online account to miles in the second online account. Alternatively, the user can select the option 604*b* to convert miles in the second online account to stars in the first online account.

If the user selects option 604*a*, the GUI may transition to the sixth GUI page. An example of the sixth GUI page 702 is shown in FIG. 7. A similar GUI page would be shown if the user selected option 604*b*, but for converting miles to stars. The sixth GUI page 702 can include an input box for allowing the user to select how many points to transfer to the second online account. Other examples may have other types of input elements, such as dropdown menus or radio boxes, through which the user can select a number of points to transfer. The user can choose to transfer all, or less than all, of the points in the first online account. In this example, the user has chosen to transfer 16 stars to the second online account. The user can then select a transfer button 708 to initiate the transfer process described herein.

Figure 8:
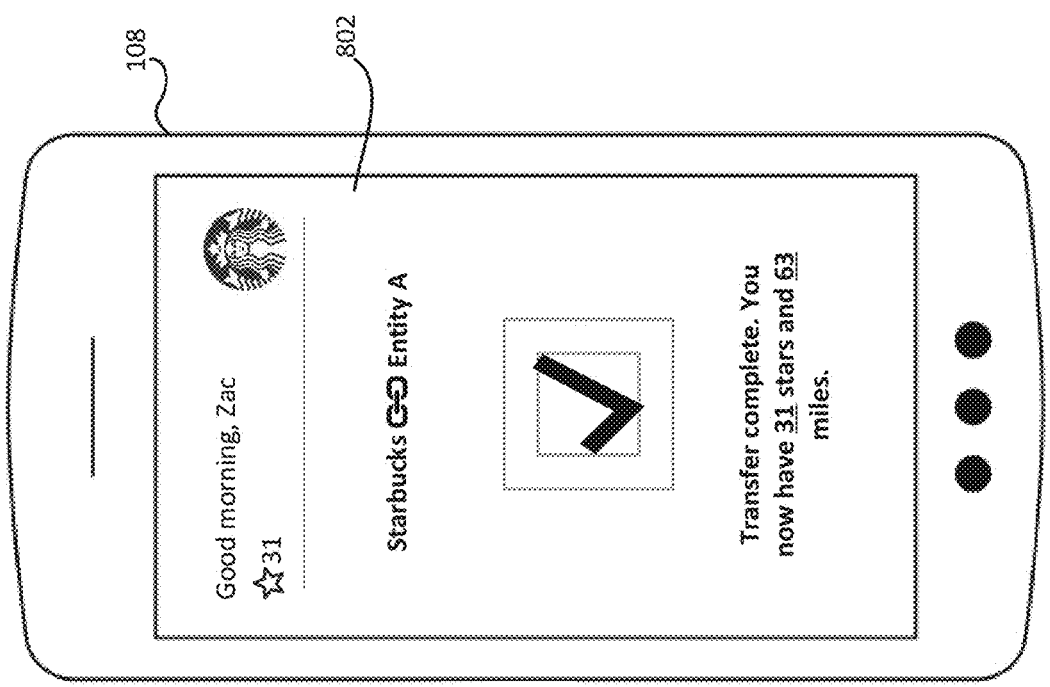
FIG. 8 shows an example of a GUI page for confirming a transfer of points between online accounts according to some aspects of the present disclosure.

Once the transfer process is complete, the GUI may transition to a seventh GUI page. An example of the seventh GUI page 802 is shown in FIG. 8. As shown, the seventh GUI page 802 can indicate that the transfer process was successful (or not successful if it failed). The seventh GUI page 802 can also include other details associated with the transfer, such as updated point balances for the first online account and the second online account. In this example, each star is roughly equivalent to two miles, so there were 32 miles added to the second online account as a result of the transfer of 16 stars from the first online account.

Figure 9:
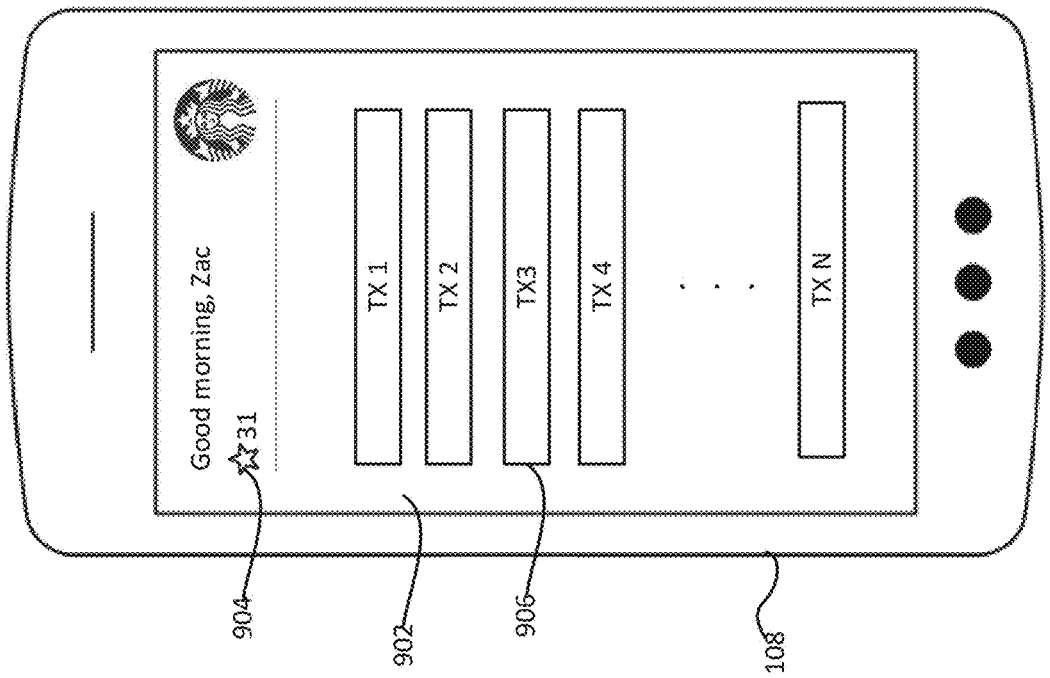
FIG. 9 shows an example of a GUI page showing a list of activity entries that includes the transfer of points between online accounts according to some aspects of the present disclosure.

In some examples, the user can interact with GUI to access an eighth GUI page. An example of the eighth GUI page 902 is as shown in FIG. 9. The eighth GUI page 902 can include an updated point balance 904 following the transfer. The eighth GUI page 902 can also include a list of interactions (e.g., transactions). One of the interactions 906 can correspond to the transfer of points between the online accounts and include details about the transfer, such as the date, time, and amount of points transferred. This may allow the user to keep a detailed record of transfers to better understand their point balance. Other interactions in the list can correspond to other types of events, such as buying coffee or other objects.

Behind the graphical user interface, the process of linking and transferring content between online accounts can involve numerous interactions between the first and second computer systems. These interactions are further described below with reference to the sequence diagrams of FIGS. 10-12. But, it should be appreciated that these sequence diagrams are intended to be illustrative and non-limiting. Other examples may include more steps, fewer steps, different steps, or a different sequence of steps than is shown in each of FIGS. 10-12.

Figure 10A:
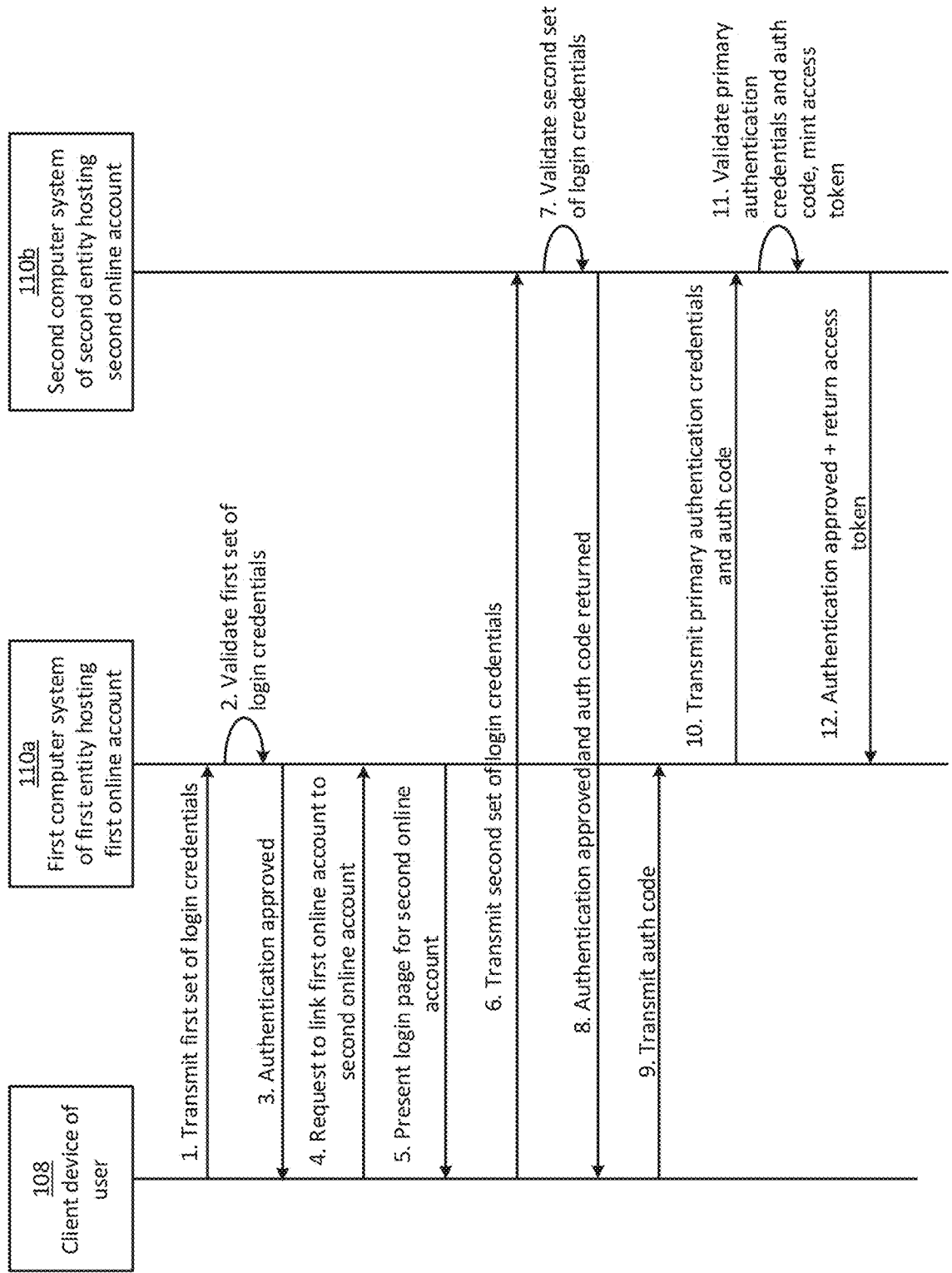
FIGS. 10A-B show a sequence diagram of an example of a process for securely linking two online accounts according to some aspects of the present disclosure.

Referring now to FIG. 10A, shown is a sequence diagram of an example of a process for linking a first online account and a second online account. The process can begin at step 1 with the client device 108 transmitting a first set of login credentials to a first computer system 110*a* for logging into a first online account, which is hosted by a first entity. At step 2, the first computer system 110*a* can validate the first set of login credentials. If the first set of login credentials are valid, at step 3, the first computer system 110*a* can transmit a first authentication approval to the client device 108.

At step 4, the client device 108 can transmit a request to link the first online account to a second online account of the user, where the second online account is hosted by a second entity. At step 5, the first computer system 110*a* can present a login page for the second online account to the client device 108. The login page can be for receiving a second set of login credentials for accessing the second online account. At step 6, the client device 108 can transmit the second set of login credentials to a second computer system 110*b* hosting the second online account, for use in accessing the second online account.

At step 7, the second computer system 110*b* can validate the second set of login credentials. If the second set of login credentials are valid, at step 8, the second computer system 110*b* can transmit a second authentication approval to the client device 108. The second computer system 110*b* can also generate an authentication code and provide it to the client device 108. The authentication code may be unique to a session initiated between the second computer system 110*b* and the client device 108.

At step 9, the client device 108 can provide the authentication code to the first computer system 110*a*. The first computer system 110*a* can receive the authentication code and forward it to the second computer system 110*b*, along with primary authentication credentials, at step 10. The primary authentication credentials can be different from the first set of login credentials and the second set of login credentials. At step 11, the second computer system 110*b* can validate the primary authentication credentials and the authentication code. If the primary authentication credentials and the authentication code are valid, the second computer system 110b can mint an access token. The access token is different from the authentication code, the first set of login credentials, the second set of login credentials, and the primary authentication credentials. At step 12, the second computer system 110b can transmit a third authentication approval to the first computer system 110a along with the access token. The process can then continue as shown in FIG. 10B.

Figure 10B:
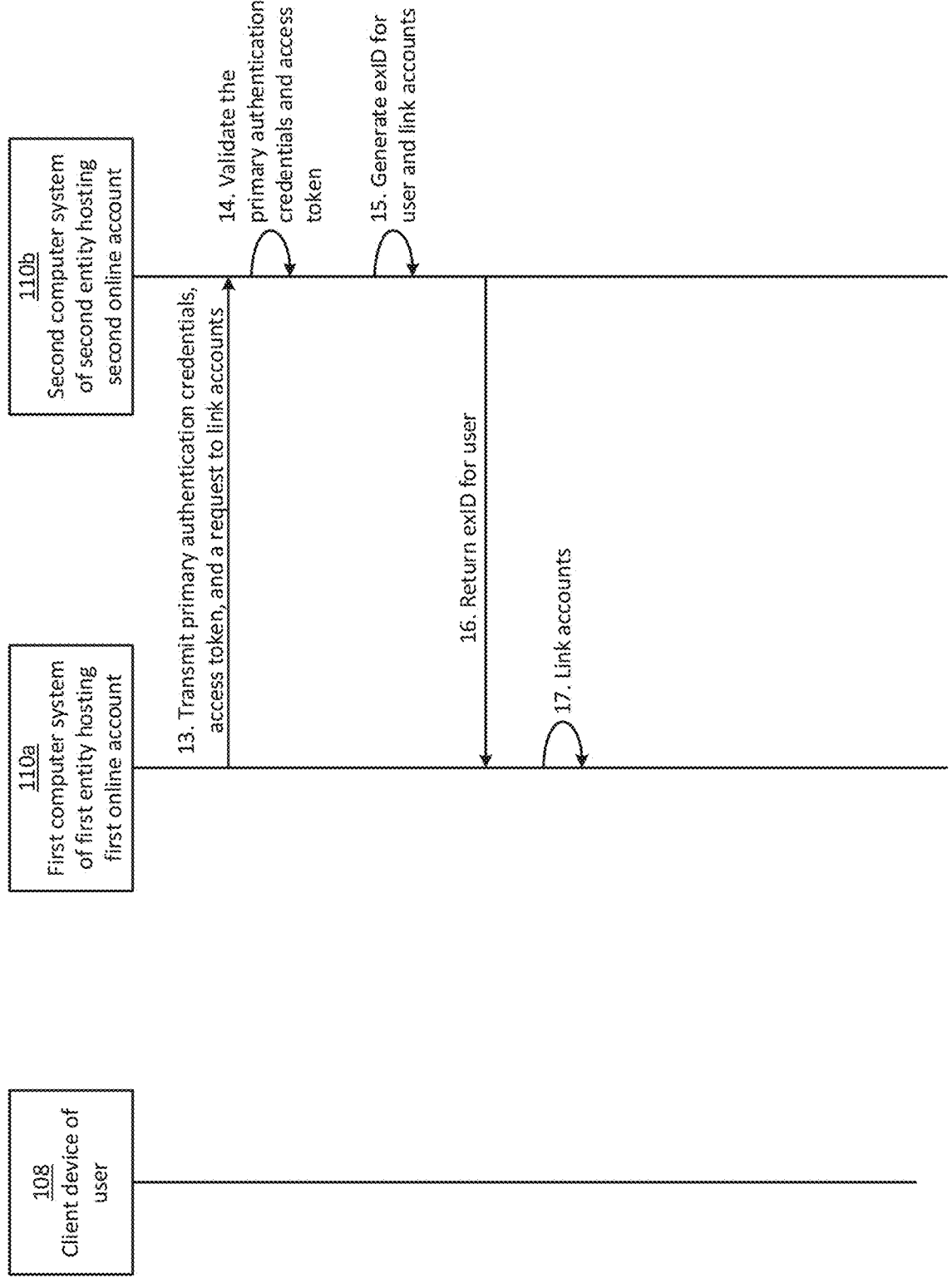

Referring now to FIG. 10B, at step 13 the first computer system 110a transmits the primary authentication credentials, the access token, and a request to link the first online account and the second online account. The second computer system 110b can receive the primary authentication credentials, the access token, and the request. At step 14, the second computer system 110b can validate the primary authentication credentials and the access token. If they are valid, the second computer system 110b can generate an exID at step 15. The second computer system 110b can also link the two accounts, for example by storing a link between the two accounts in an account link datastore.

At step 16, the second computer system 110b can transmit the exID for the user to the first computer system 110a. The first computer system 110a can receive the exID and save it. At step 17, the first computer system 110a may also link the two accounts, for example by storing a link between the two accounts in an account link datastore.

Although the process shown in FIGS. 10A-B relates to linking two online accounts together, this process can be used to link any number and types of online accounts together. For example, the first online account can be linked to two or more other online accounts using the techniques described herein. And although the second computer system 110b generated the exID in the above example, in other examples the first computer system 110a can generate an exID and provide it to the second computer system 110b.

Figure 11:
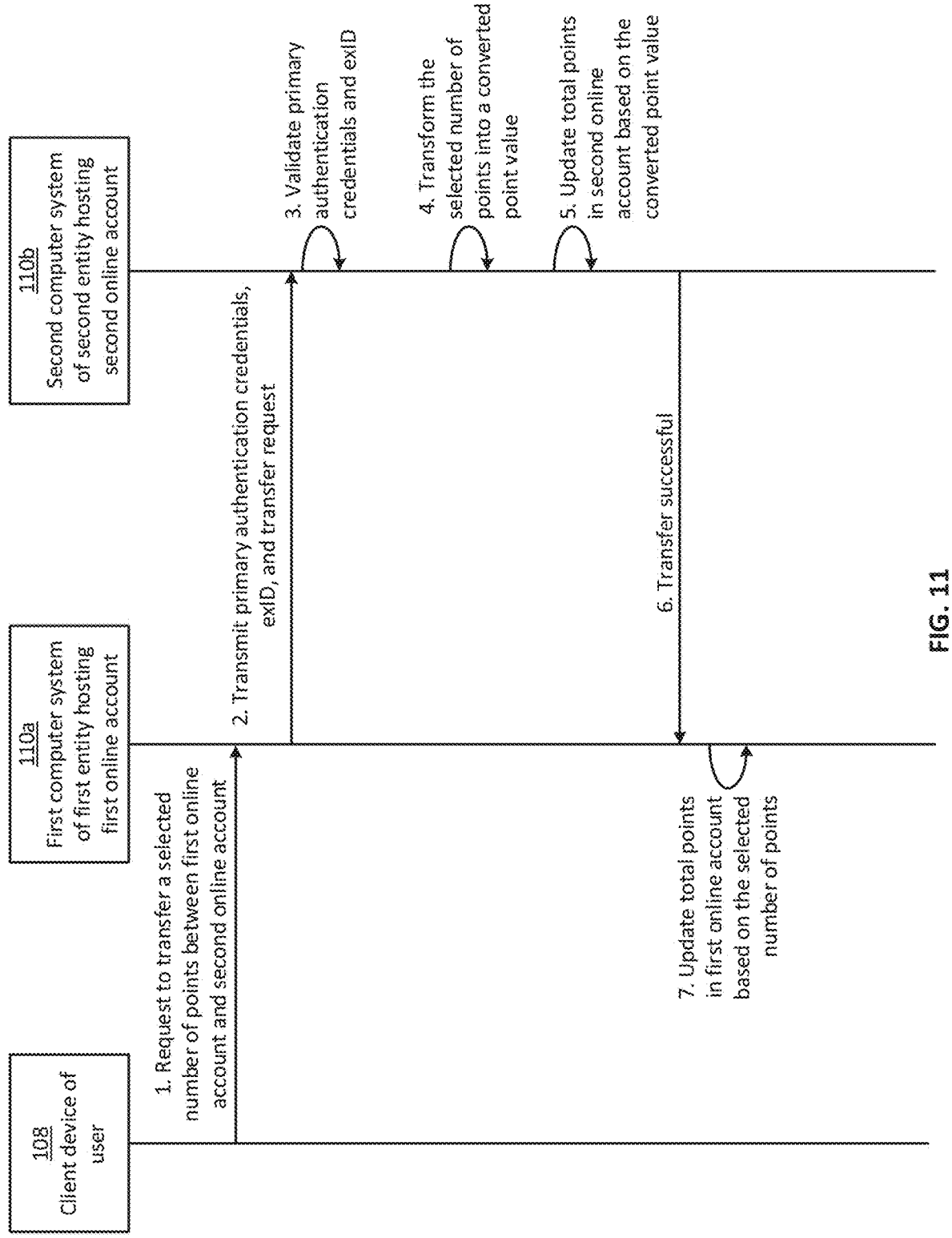
FIG. 11 shows a sequence diagram of an example of a process for securely transferring points between online accounts according to some aspects of the present disclosure.
Figure 12:
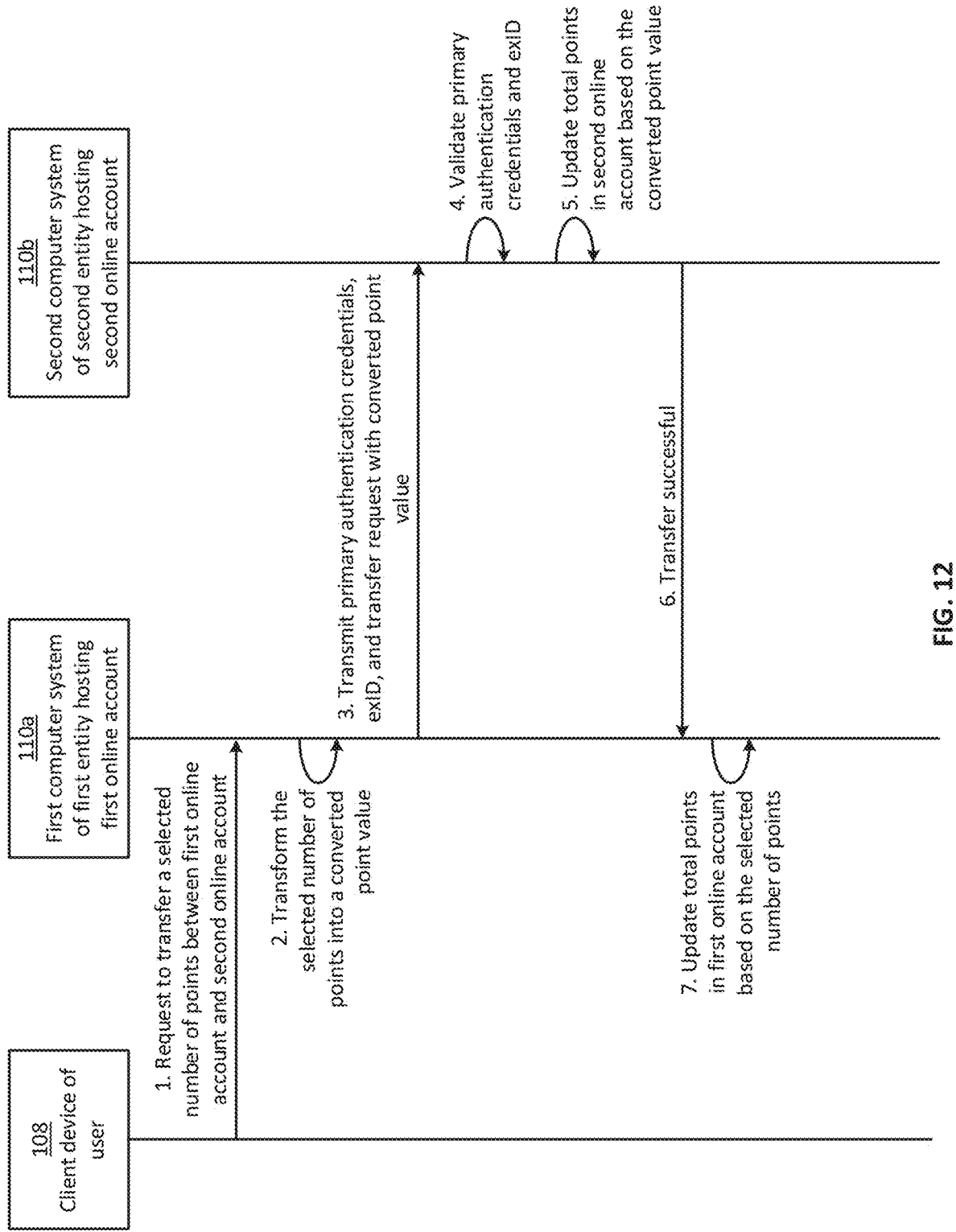
FIG. 12 shows a sequence diagram of another example of a process for securely transferring points between online accounts according to some aspects of the present disclosure.

FIGS. 11-12 show sequence diagrams of examples of processes for securely transferring points between online accounts. Prior to beginning the processes shown in FIGS. 11-12, some or all of the steps of FIGS. 10A-B may have been performed. For example, the user may be prevented from transferring points between the online accounts until after the online accounts have been linked together via the process shown in FIGS. 10A-B. In this way, point transfers between the two online accounts may be disabled until the two accounts are linked together, in some examples.

The process of FIG. 11 can begin at step 1 in which a client device 108 transmits a request to transfer a selected number of points between the first online account 104a and the second online account 104b. The first online account 104a is hosted on the first computer system 110a, and the second online account 104b is hosted on the second computer system 110b. At step 2, the first computer system 110a can transmit the primary authentication credentials, exID associated with the second online account 104b, and the transfer request to the second computer system 110b. The first computer system 110a can transmit this information to the second computer system 110b in response to receiving the request from the client device 108.

At step 3, the second computer system 110b can validate the primary authentication credentials and the exID. If they are valid, at step 4, the second computer system 110b can transform the selected number of points into a converted point value. Transforming the selected number of points into a converted point value may involve converting the selected number of points from a first point system associated with the first online account 104a to a second point system associated with the second online account 104b. The second computer system 110b may employ one or more rules or algorithms to perform this transformation. If the first point system does not correspond one-to-one with the second point system, then the converted point value will be different than the selected number of points.

In some examples, the transformation may be dynamic rather than fixed. For example, the transformation may depend on various factors that can change over time. As a result, the transformation may produce different converted point values at different points in time. For example, the first entity 106a or second entity 106b may run a promotion on a first day and not on a second day, which may yield a converted point value that is higher on the first day than on the second day.

After generating the converted point value, the second computer system 110b can update the total points in the second online account 104b based on the converted point value. For example, the second computer system 110b can increase the total points in the second online account 104b by the converted point value. At step 6, the second computer system 110b can transmit a success notification to the first computer system 110a indicating that the transfer was successful.

At step 7, the first computer system 110a can update the total points in the first online account 104a based on the selected number of points. For example, the first computer system 110a can decrease the total points in the first online account 104a by the selected number of points. The first computer system 110a can update the total points in the first online account 104a in response to receiving the success notification from the second computer system 110b.

FIG. 12 shows another example of a process for securely transferring points between online accounts. In this example, the point conversion is performed on the first computer system 110a.

The process can begin at step 1 in which a client device 108 transmits a request to transfer a selected number of points between the first online account 104a and the second online account 104b. The first online account 104a is hosted on the first computer system 110a, and the second online account 104b is hosted on the second computer system 110b.

At step 2, the first computer system 110a can transform the selected number of points into a converted point value. Transforming the selected number of points into a converted point value may involve converting the selected number of points from a first point system associated with the first online account 104a to a second point system associated with the second online account 104b. The first computer system 110a may employ one or more rules or algorithms to perform this transformation. If the first point system does not correspond one-to-one with the second point system, then the converted point value will be different than the selected number of points. In some examples, the transformation may be dynamic rather than fixed, as described above.

At step 3, the first computer system 110a can transmit the primary authentication credentials, exID associated with the second online account 104b, and a transfer request indicating the converted point value to the second computer system 110b. At step 4, the second computer system 110b can validate the primary authentication credentials and the exID. If they are valid, at step 5, the second computer system 110b can update the total points in the second online account 104b based on the converted point value. For example, the second computer system 110b can increase the total points in the second online account 104b by the converted point value. At step 6, the second computer system 110b can transmit a success notification to the first computer system 110a indicating that the transfer was successful.

At step 7, the first computer system 110a can update the total points in the first online account 104a based on the selected number of points. For example, the first computer system 110a can decrease the total points in the first online account 104a by the selected number of points. The first computer system 110a can update the total points in the first online account 104a in response to receiving the success notification from the second computer system 110b.

Figure 13:
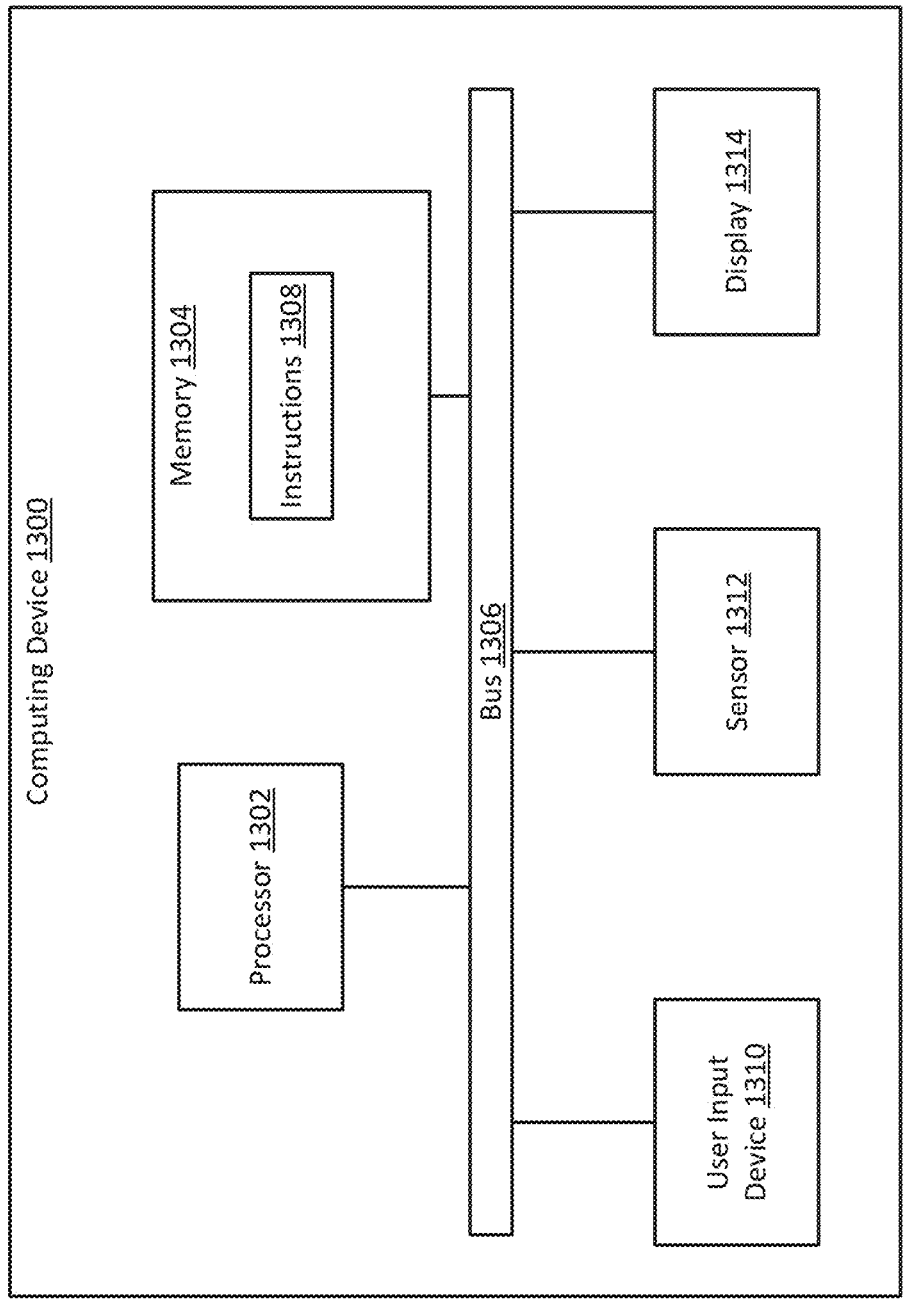
FIG. 13 shows a block diagram of an example of a computing device usable to implement some aspects of the present disclosure.

FIG. 13 shows a block diagram of an example of a computing device usable to implement some aspects of the present disclosure. The computing device 1300 may correspond to the first computer system 110a, the second computer system 110b, or the client device 108 of FIG. 1. Examples of the computing device 1300 can include a server, a desktop computer, a laptop computer, a tablet, a smart phone, or a wearable device.

The computing device 1300 includes a processor 1302 communicatively coupled to a memory 1304 by a bus 1306. The processor 1302 can include one processor or multiple processors. Examples of the processor 1302 can include a Field-Programmable Gate Array (FPGA), an application-specific integrated circuit (ASIC), or a microprocessor. The processor 1302 can execute instructions 1308 stored in the memory 1304 to perform operations. The instructions 1308 may include processor-specific instructions generated by a compiler or an interpreter from code written in any suitable computer-programming language, such as C, C++, C #, Java, or Python.

The memory 1304 can include one memory device or multiple memory devices. The memory 1304 can be volatile or non-volatile (e.g., it can retain stored information when powered off). Examples of the memory 1304 include electrically erasable and programmable read-only memory (EEPROM), flash memory, or cache memory. At least some of the memory 1304 includes a non-transitory computer-readable medium from which the processor 1302 can read instructions 1308. A computer-readable medium can include electronic, optical, magnetic, or other storage devices capable of providing the processor 1302 with the instructions 1308 or other program code. Examples of a computer-readable mediums include magnetic disks, memory chips, ROM, random-access memory (RAM), an ASIC, a configured processor, and optical storage.

The computing device 1300 also includes input components. One example of an input component can include the user input device 1310, which may include one user input device or multiple user input devices. Examples of such user input devices can include a mouse, a keyboard, a touchpad, and a touch-screen display. Another example of an input component can include the sensor 1312, which may include one sensor or multiple sensors. Examples of such sensors can include a GPS unit, a gyroscope, an accelerometer, an inclinometer, and a camera.

The computing device 1300 further includes output components. One example of an output component can include the display 1314, which may include one display or multiple displays. Examples of such displays can include a liquid crystal display (LCD) or a light-emitting diode (LED) display. The computing device 1300 may also include an audio output component such as a speaker, a haptic output component such as a haptic actuator, or another type of output component. But for simplicity, these other output components are not shown in FIG. 13.

While FIG. 13 depicts the components (e.g., processor 1302, memory 1304, and display 1314) as being internal to a single housing, in other examples the components may be distributed and in wired or wireless communication with one another. For example, the display 1314 may be a computer monitor that is separate from and in communication with the computing device 1300 that performs the main processing. And although FIG. 13 depicts a certain number and arrangement of components, this is for illustrative purposes and not intended to be limiting. Other examples can include more components, fewer components, different components, or a different arrangement of the components shown in FIG. 13.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:
one or more processors; and
one or more memories including instructions that are executable by the one or more processors to perform a linking process for linking a first online account of a user with a second online account of the user, wherein the first online account is hosted by a first computer system of a first entity and the second online account is hosted by a second computer system of a second entity that is different from the first entity, and wherein the linking process involves:
receiving an authentication code associated with the user, wherein the authentication code was previously generated by the second computer system for the user in response to validating a set of login credentials provided by the user, the authentication code being different than the set of login credentials;
authenticating with the second computer system by providing primary authentication credentials and the authentication code to the second computer system, the primary authentication credentials being different than the set of login credentials;
subsequent to authenticating with the second computer system, receiving an access token from the second computer system; and
subsequent to receiving the access token, providing the access token to the second computer system along with a request to link the first online account and the second online account, wherein the second computer system is configured to link the first online account with the second online account based on validating the access token.

2. The system of claim 1, wherein the second computer system is configured to:
receive the request from the first computer system;
in response to receiving the request, validate the access token; and
in response to determining that the access token is valid:
generate an external identifier corresponding to the second online account;
provide the external identifier to the first computer system; and
link the first online account to the second online account in an account link datastore.

3. The system of claim 1, wherein the first computer system is configured to:

receive an external identifier corresponding to the second online account from the second computer system; and subsequent to receiving the external identifier, transmit a communication to the second computer system, the communication being associated with a point transfer for transferring points between the first online account and the second online account, wherein the communication includes the primary authentication credentials and the external identifier, and wherein the second computer system is configured to validate the point transfer based on the primary authentication credentials and the external identifier in the communication.

4. The system of claim 1, wherein the first computer system includes the one or more processors.

5. The system of claim 1, wherein the one or more memories further include instructions that are executable by the one or more processors to:

provide a first GUI page through which the user can input a first set of login credentials for authenticating with the first computer system; and subsequent to the first set of login credentials being authenticated by the first computer system:

provide a second GUI page through which the user can selectively link the first online account to the second online account;

detect a first user input for linking the first online account to the second online account;

in response to detecting the first user input, provide a third GUI page through which the user can input a second set of login credentials for authenticating with the second computer system;

detect a second user input for initiating the linking process for linking the first online account to the second online account; and in response to detecting the second user input, initiate the linking process.

6. The system of claim 1, wherein the first computer system is configured to receive the authentication code from a client device of the user.

7. The system of claim 1, wherein the first computer system is configured to link the first online account to the second online account in an account link datastore.

8. A method comprising:

executing, by one or more processors, a linking process for linking a first online account of a user with a second online account of the user, wherein the first online account is hosted by a first computer system of a first entity and the second online account is hosted by a second computer system of a second entity that is different from the first entity, and wherein the linking process involves:

receiving an authentication code associated with the user, wherein the authentication code was previously generated by the second computer system for the user in response to validating a set of login credentials provided by the user, the authentication code being different than the set of login credentials;

authenticating with the second computer system by providing primary authentication credentials and the authentication code to the second computer system, the primary authentication credentials being different than the set of login credentials;

subsequent to authenticating with the second computer system, receiving an access token from the second computer system; and subsequent to receiving the access token, providing the access token to the second computer system along with a request to link the first online account and the second online account, wherein the second computer system is configured to link the first online account with the second online account based on validating the access token.

9. The method of claim 8, wherein the second computer system is configured to:

receive the request from the first computer system;

in response to receiving the request, validate the access token; and in response to determining that the access token is valid:

generate an external identifier corresponding to the second online account;

provide the external identifier to the first computer system; and link the first online account to the second online account in an account link datastore.

10. The method of claim 8, wherein the first computer system is configured to:

receive an external identifier corresponding to the second online account from the second computer system; and subsequent to receiving the external identifier, transmit a communication to the second computer system, the communication being associated with a point transfer for transferring points between the first online account and the second online account, wherein the communication includes the primary authentication credentials and the external identifier, and wherein the second computer system is configured to validate the point transfer based on the primary authentication credentials and the external identifier in the communication.

11. The method of claim 8, wherein the first computer system includes the one or more processors.

12. The method of claim 8, further comprising:

providing a first GUI page through which the user can input a first set of login credentials for authenticating with the first computer system; and subsequent to the first set of login credentials being authenticated by the first computer system:

providing a second GUI page through which the user can selectively link the first online account to the second online account;

detecting a first user input for linking the first online account to the second online account;

in response to detecting the first user input, providing a third GUI page through which the user can input a second set of login credentials for authenticating with the second computer system;

detecting a second user input for initiating the linking process for linking the first online account to the second online account; and in response to detecting the second user input, initiating the linking process.

13. The method of claim 8, wherein the first computer system is configured to receive the authentication code from a client device of the user.

14. The method of claim 8, wherein the first computer system is configured to link the first online account to the second online account in an account link datastore.

15. A non-transitory computer-readable medium comprising program code that is executable by one or more processors for causing the one or more processors to perform a linking process for linking a first online account of a user with a second online account of the user, wherein the first online account is hosted by a first computer system of a first entity and the second online account is hosted by a second computer system of a second entity that is different from the first entity, and wherein the linking process involves:
  receiving an authentication code associated with the user, wherein the authentication code was previously generated by the second computer system for the user in response to validating a set of login credentials provided by the user, the authentication code being different than the set of login credentials;
  authenticating with the second computer system by providing primary authentication credentials and the authentication code to the second computer system, the primary authentication credentials being different than the set of login credentials;
  subsequent to authenticating with the second computer system, receiving an access token from the second computer system; and
  subsequent to receiving the access token, providing the access token to the second computer system along with a request to link the first online account and the second online account, wherein the second computer system is configured to link the first online account with the second online account based on validating the access token.

16. The non-transitory computer-readable medium of claim 15, wherein the second computer system is configured to:
  receive the request from the first computer system;
  in response to receiving the request, validate the access token; and
  in response to determining that the access token is valid:
    generate an external identifier corresponding to the second online account;
    provide the external identifier to the first computer system; and
    link the first online account to the second online account in an account link datastore.

17. The non-transitory computer-readable medium of claim 15, wherein the first computer system is configured to:
  receive an external identifier corresponding to the second online account from the second computer system; and
  subsequent to receiving the external identifier, transmit a communication to the second computer system, the communication being associated with a point transfer for transferring points between the first online account and the second online account, wherein the communication includes the primary authentication credentials and the external identifier, and wherein the second computer system is configured to validate the point transfer based on the primary authentication credentials and the external identifier in the communication.

18. The non-transitory computer-readable medium of claim 15, wherein the first computer system includes the one or more processors.

19. The non-transitory computer-readable medium of claim 15, further comprising program code that is executable by the one or more processors to:
  provide a first GUI page through which the user can input a first set of login credentials for authenticating with the first computer system; and
  subsequent to the first set of login credentials being authenticated by the first computer system:
    provide a second GUI page through which the user can selectively link the first online account to the second online account;
    detect a first user input for linking the first online account to the second online account;
    in response to detecting the first user input, provide a third GUI page through which the user can input a second set of login credentials for authenticating with the second computer system;
    detect a second user input for initiating the linking process for linking the first online account to the second online account; and
    in response to detecting the second user input, initiate the linking process.

20. The non-transitory computer-readable medium of claim 15, wherein the first computer system is configured to receive the authentication code from a client device of the user, wherein the first computer system is configured to link the first online account to the second online account in an account link datastore.

* * * * *